US012284082B1

(12) United States Patent
Panchal

(10) Patent No.: US 12,284,082 B1
(45) Date of Patent: Apr. 22, 2025

(54) SYSTEMS AND METHODS FOR RADIO ACCESS NETWORK SERVICE FEASIBILITY ASSESSMENT

(71) Applicant: Verizon Patent and Licensing Inc., Basking Ridge, NJ (US)

(72) Inventor: Jignesh S. Panchal, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/485,169

(22) Filed: Oct. 11, 2023

(51) Int. Cl.
*H04L 41/0896* (2022.01)
*H04L 41/16* (2022.01)
*H04L 41/5009* (2022.01)

(52) U.S. Cl.
CPC .......... *H04L 41/0896* (2013.01); *H04L 41/16* (2013.01); *H04L 41/5009* (2013.01)

(58) Field of Classification Search
CPC .. H04L 41/0896; H04L 41/16; H04L 41/5009
See application file for complete search history.

(56) References Cited

U.S. PATENT DOCUMENTS

2020/0228990 A1* 7/2020 Xu ...................... H04L 41/5054
2023/0131468 A1* 4/2023 Amer ...................... H04L 43/08 455/423

* cited by examiner

*Primary Examiner* — Soe Hlaing

(57) ABSTRACT

A device may include a processor configured to obtain requirements for a wireless communication service to be deployed on a carrier on a sector of a base station and obtain key performance indicator (KPI) values for the carrier on the sector of the base station. The processor may be further configured to use a trained machine learning model to determine a required capacity and a predicted average latency for the wireless communication service based on the obtained requirements and the obtained KPI values; determine that the wireless communication service satisfies a deployment requirement to be deployed on the carrier on the sector of the base station based on the determined required capacity and the predicted average latency; and deploy the wireless communication service on the carrier on the sector of the base station, in response to determining that the wireless communication service satisfies the deployment requirement.

20 Claims, 13 Drawing Sheets

325

| SECTOR ID 410 |
| BASE STATION 420 |
| CARRIER 432 |
| CAPACITY 434 |
| THROUGHPUT 436 |
| KPIs 438 |
| CONGESTION 440 |

430 ... — encompasses CARRIER 432 through CONGESTION 440

400 ... — encompasses the full entry

355

| SERVICE ID 510 |
| QoS 520 |
| REQUIRED LATENCY 530 |
| CARRIER 542 |
| SECTOR 544 |
| AVERAGE LATENCY 546 |
| REQUIRED CAPACITY 548 |
| LEFTOVER CAPACITY 550 |
| DEPLOYMENT 560 |

540 ... — encompasses CARRIER 542 through DEPLOYMENT 560

500 ... — encompasses the full entry

800

900

1000

1200

1300

SYSTEMS AND METHODS FOR RADIO ACCESS NETWORK SERVICE FEASIBILITY ASSESSMENT

BACKGROUND INFORMATION

To satisfy the needs and demands of users of mobile communication devices, providers of wireless communication services continue to improve and expand their networks. One aspect of such improvements includes the development of wireless access networks and options to utilize such wireless access networks. A provider may operate a wireless access network that manages a large number of base stations and provides different types of services under varying conditions. Providing new types of services under varying conditions poses various challenges.

DETAILED DESCRIPTION OF EMBODIMENTS

Figure 1:
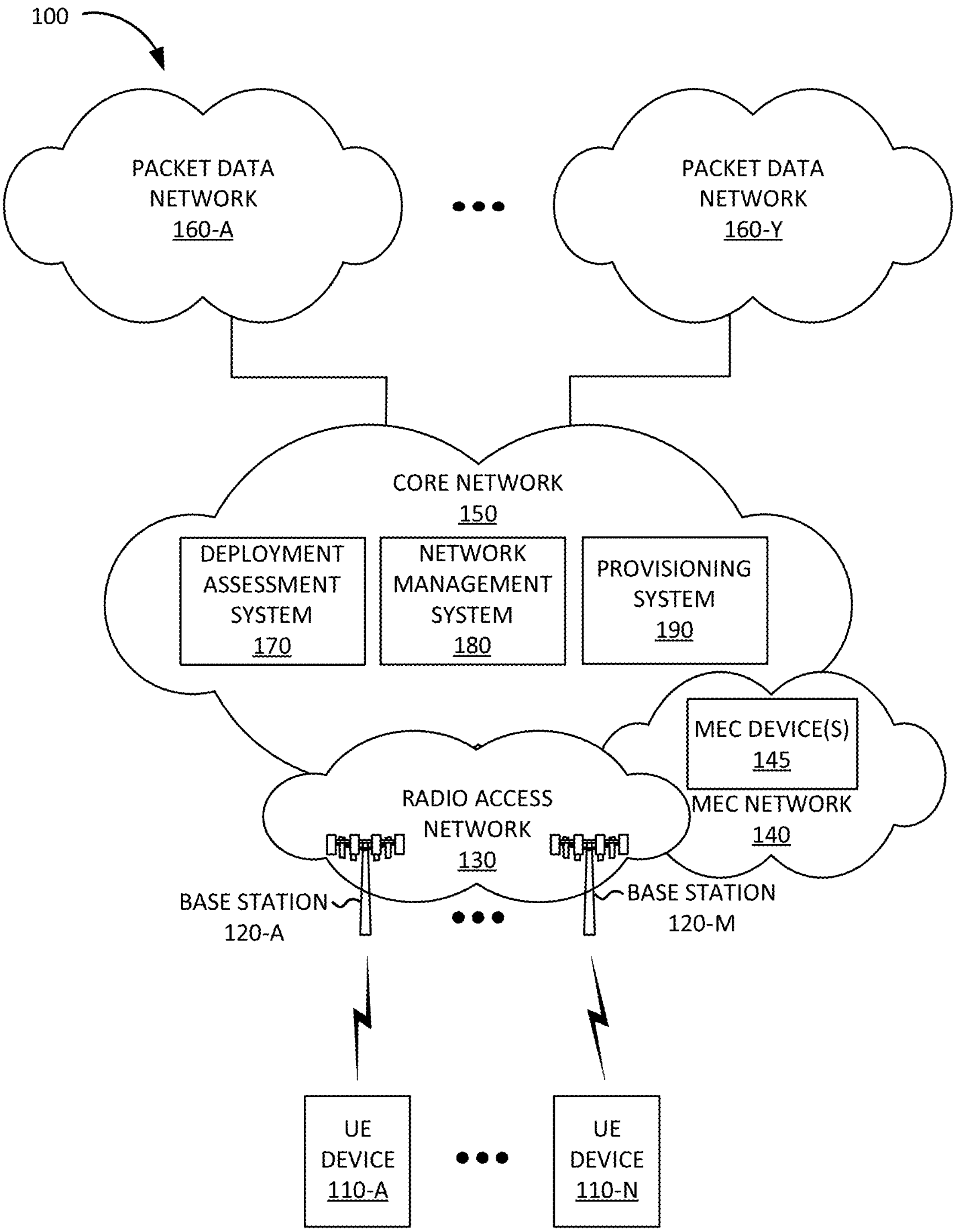
FIG. 1 illustrates an environment according to an implementation described herein.

The following detailed description refers to the accompanying drawings. The same reference numbers in different drawings identify the same or similar elements.

A cellular wireless network enables user equipment (UE) devices to connect to networks via a Radio Access Network (RAN) and a core network in order to communicate with other devices connected to the RAN, communicate with devices in other networks, access applications or services hosted by a provider in the core network, and/or make use of other types of communication services. For example, a UE device may use enhanced Mobile Broadband (eMBB) services for Voice over Internet Protocol (VoIP) telephone calls and/or data sessions for accessing Internet websites, use massive Internet of Things (IoT) communication, use Ultra-Reliable Low Latency Communication (URLLC) for mission critical low latency communication, etc. Each type of wireless communication service may be associated with a different set of requirements.

In an example, in order to establish a communication session, a UE device may establish a Protocol Data Unit (PDU) session in the core network via the RAN. The UE device may then establish one or more data flows in the PDU session. Each data flow may be associated with a Quality of Service (QoS) and/or other types of service requirements. Different QoS classes may be associated with different latency requirements.

As another example, an important feature of next generation cellular wireless networks, such as, for example, a Fifth Generation (5G) network, used to meet requirements for different types of communication services, is network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources. Each network slice may be configured to implement a different set of requirements and/or priorities and/or may be associated with a particular QoS class, type of service, security requirement, and/or particular enterprise customer associated with a set of UE devices. For example, a 5G network may include an eMBB network slice, an mIoT network slice, a URLLC network slice, etc.

As yet another example, another enhancement to wireless communication services to reduce latency is the use of Multi-Access Edge Computing (MEC) architecture. The MEC architecture includes devices and connections located at the network edge relative to the point of attachment of a UE device to a wireless communication network. Thus, the MEC network may be located in geographic proximity to the base station and be close to the base station from a network topology perspective. The devices in a MEC network may implement services previously implemented in a core network and/or a cloud computing center and enable processing to be offloaded from the core network and/or cloud computing center at a reduced latency. A MEC service may be deployed in a MEC network and UE devices, connected to a base station associated with the MEC network, may access the MEC service at a latency below the guaranteed maximum latency.

A provider of wireless communication services may plan to deploy a new wireless communication service in a RAN and make the wireless communication service available via a set of base stations associated with the RAN. For example, the provider may plan to deploy a new QoS class, a new network slice, a new MEC service, and/or another type of new wireless communication service. The new wireless communication service may be associated with one or more requirements, such as a latency requirement, and the provider may need to be able to determine whether base stations in a RAN would be able to satisfy the service requirements of the new wireless communication service and continue to satisfy other service requirements.

Implementations described herein relate to systems and methods for RAN service feasibility assessment. A base station may include multiple sectors and each sector may include a wireless radio frequency (RF) transceiver servicing a sector of a coverage area centered on the base station. For example, a base station may include three sectors, each servicing a 120° sector. A "sector" of a base station, as the term is used herein, may refer to an RF transceiver of a base station servicing a particular sector of the coverage area of the base station. A sector may be configured for transmitting and receiving using multiple carriers. The term "carrier," as used herein, may refer to a particular RF transmission band used in cellular wireless communication, such as a Fourth Generation (4G) band, a 5G band, etc. A carrier deployed on a particular sector of a base station may be referred to herein as a "carrier on a sector," or as a "sector-carrier." A provider of wireless communication services may select a new wireless communication service for deployment and determine whether a carrier on a sector of a base station satisfies a deployment requirement.

A computer device may be configured to determine whether a sector and a carrier of the base station has sufficient capacity to deploy a wireless communication service based on a current capacity and an expected future capacity. The current capacity may be based on an available capacity associated with the carrier on the sector of the base station and a throughput associated with the carrier on the sector of the base station, for existing wireless communication services already deployed on the carrier on the sector of the base station. The expected future capacity may be based on an expected average number of users and an expected throughput per user. The expected average number of users may be based on, for example, an expected future number of users of the new wireless communication service, once deployed.

If the computer device determines that the carrier on the sector of the base station does not have sufficient capacity to deploy the wireless communication service, the computer device may designate the carrier on the sector of the base station as a congested carrier on the sector and may, in response, perform capacity budgeting for the carrier on the sector of the base station.

If the computer device determines that the carrier on the sector of the base station does have sufficient capacity to deploy the wireless communication service, the computer device may proceed to determine whether the wireless communication service satisfies a deployment requirement to be deployed on the carrier on the sector of the base station. The computer device may be configured to obtain one or more requirements for a wireless communication service to be deployed on a carrier on a sector of a base station, obtain one or more key performance indicator (KPI) values for the carrier on the sector of the base station, and use a trained machine learning model to determine a required capacity and a predicted average latency for the wireless communication service based on the obtained one or more requirements and the obtained one or more KPI values. The computer device may further use the trained machine learning model to determine a leftover capacity for the carrier on the sector of the base station if the wireless communication service is deployed.

The computer device may be further configured to determine whether the wireless communication service satisfies the deployment requirement to be deployed on the carrier on the sector of the base station based on the determined required capacity and predicted average latency. If the wireless communication service satisfies the deployment requirement, the wireless communication service may be deployed on the carrier on the sector of the base station.

The KPI values for the carrier on the sector of the base station may include, for example, a carrier frequency, an available bandwidth value, an unused capacity value, a spectral efficiency value, a user distribution value, a reliability value, an application demand value, a discontinuous mode percentage value, and/or another type of KPI value.

Furthermore, the computer device may be configured to determine whether multiple sectors and carriers for a set of base stations satisfy the deployment requirement for the wireless communication service, aggregate deployment feasibility information for the sectors and carriers of the set of base stations, and generate a deployment feasibility report for the set of base stations based on the aggregated deployment feasibility information. For example, the computer device may generate a map that relates expected latency values for the wireless communication service to locations associated with particular base stations. Moreover, the computer device may determine relevant KPI values for a target latency for the wireless communication service using he aggregated deployment feasibility information.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), base stations 120-A to 120-M (referred to herein collectively as "base stations 120" and individually as "base station 120") in a RAN 130, a MEC network 140 (which includes MEC devices 145), a core network 150, and packet data networks (PDNs) 160-A to 160-Y (referred to herein collectively as "PDNs 160" and individually as "PDN 160").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player, a Wi-Fi® access point, a fixed wireless access device, a smart television, etc.; a portable gaming system; a home appliance device; a home monitoring device; and/or any other type of computer device with wireless communication capabilities. In some implementations, UE device 110 may communicate using machine-to-machine (M2M) communication, such as Machine Type Communication (MTC), and/or another type of M2M communication for IoT applications.

RAN 130 may include base stations 120. Base station 120 may be configured for one or more Radio Access Technology (RAT) types. For example, base station 120 may include a 5G New Radio (NR) base station (e.g., a gNodeB) and/or a 4G Long Term Evolution (LTE) base station (e.g., an eNodeB). Thus, base station 120 may enable UE device 110 to communicate with core network 150 using cellular wireless signals. Each base station 120 may include devices and/or components that enable cellular wireless communication with UE devices 110. For example, base station 120 may include a set of sectors (e.g., 1200 sectors, 900 sectors, etc.) and each sector may include an RF transceiver configured to communicate with UE devices 110 using a 5G NR air interface, a 4G LTE air interface, and/or using another type of cellular air interface. Furthermore, each sector may be configured to operate on one or more carriers.

MEC network 140 may be associated with one or more base stations 120 and may provide MEC services for UE devices 110 attached to the base stations 120. MEC network 140 may be in proximity to base stations 120 from a geographic and network topology perspective, thus enabling low latency services to be provided to UE devices 110. As an example, MEC network 140 may be located on the same site as base station 120. As another example, MEC network 140 may be geographically closer to one of base stations 120 and reachable via fewer network hops and/or fewer switches, than other base stations 120.

MEC network 140 may include one or more MEC devices 145. MEC devices 145 may provide MEC services to UE devices 110. A MEC service may include, for example, a low-latency microservice associated with a particular application, a microservice associated with a virtualized network function (VNF) of core network 150, a cloud computing service, such as cache storage service, artificial intelligence (AI) accelerator service, machine learning service, an image processing service, a data compression service, a locally centralized gaming service, a Graphics Processing Units (GPUs) and/or other types of hardware accelerator service, and/or other types of cloud computing services.

Core network 150 may be managed by a provider of cellular wireless communication services and may manage communication sessions of subscribers connecting to core network 150 via RAN 130. For example, core network 150 may establish an Internet Protocol (IP) connection between UE devices 110 and PDN 160. In some implementations, core network 150 may include a 5G core network. In other implementations, core network 150 may include a 4G core network (e.g., an evolved packet core (EPC) network) and/or another type of core network.

The components of core network 150 may be implemented as dedicated hardware components or as virtualized functions implemented on top of a common shared physical infrastructure using SDN. For example, an SDN controller may implement one or more of the components of core network 150 using an adapter implementing a VNF virtual machine, a Cloud Native Function (CNF) container, an event driven serverless architecture interface, and/or another type of SDN component. The common shared physical infrastructure may be implemented using one or more devices 200 described below with reference to FIG. 2 in a cloud computing center associated with core network 150. Additionally, or alternatively, some, or all, of the shared physical infrastructure may be implemented using one or more devices 200 implemented in MEC device 145 in MEC network 140. Core network 150 may include a deployment assessment system 170, a network management system 180, and a provisioning system 190.

Deployment assessment system 170 may include one or more computer devices, such as server devices and/or cloud computing devices, configured to perform a deployment assessment for a wireless communication service with respect to one or more base stations 120. For example, deployment assessment system 170 may determine whether a carrier on a sector of a base station has sufficient capacity and/or resources to deploy the wireless communication service while satisfying the requirements of the wireless communication service. Furthermore, deployment assessment system 170 may perform a deployment assessment for the wireless communication service with respect to a set of base stations by aggregating deployment feasibility information for the set of base stations and generating a report based on the aggregated information.

Network management system 180 may include one or more computer devices, such as server devices and/or cloud computing devices, configured to manage network devices and/or network connections in RAN 130, MEC network 140, and/or core network 150. Network management system 180 may receive an indication from deployment assessment system 170 that a carrier on a sector of base station 120 is congested and may perform capacity budgeting with respect to the carrier on the sector of base station 120. For example, network management system 180 may increase a capacity of base station 120, perform load balancing, adjust a maximum number of connections enabled for base station 120, and/or perform another type of capacity budgeting operation. Increasing the capacity of base station 120 may include increasing an available bandwidth of a carrier (e.g., adding more channels, etc.), adding another carrier/band, adding another sector to base station 120, increasing the transmission power of base station 120, adding a new radio head within the transmission rate of base station 120 and load balancing traffic between the new radio head and radio heads associated with the base station 120, and/or otherwise increasing the capacity of base station 120.

Provisioning system 190 may include one or more computer devices, such as server devices and/or cloud computing devices, configured to provision services in RAN 130, MEC network 140, and/or core network 150. For example, provisioning system 190 may receive an indication from deployment assessment system 170 that a wireless communication service is to be deployed on a carrier on a sector of base station 120 and, in response, provision resources in base station 120 and/or configure the provisioned resources to implement the wireless communication service.

PDNs 160-A to 160-Y may each be associated with a Data Network Name (DNN) in 5G, and/or an Access Point Name (APN) in 4G. UE device 110 may request a connection to PDN 160 using a DNN or an APN. PDN 160 may include, and/or be connected to, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
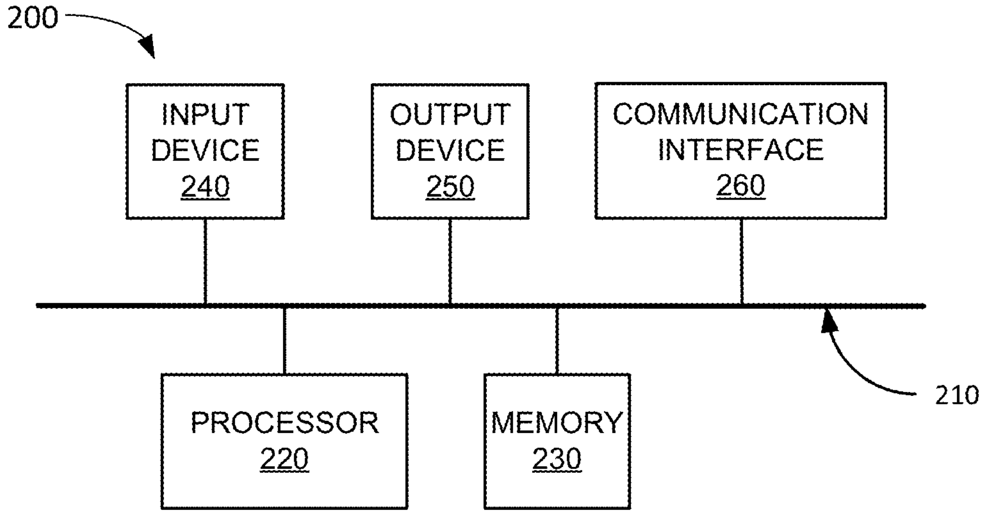
FIG. 2 illustrates exemplary components of device that may be included in a component of an environment according to an implementation described herein.

FIG. 2 illustrates example components of a device 200 according to an implementation described herein. UE device 110, base station 120, MEC device 145, deployment assessment system 170, network management system 180, provisioning system 190, and/or other components of core network 150 or RAN 130, may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic. Additionally, or alternatively, processor 220 may include a hardware accelerator integrated circuit or processing logic, such as a graphics processing unit (GPU), a tensor processing unit (TPU), and/or another type of hardware accelerator.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to one or more antennas/antenna arrays for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to deployment feasibility assessment for a wireless communication service. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
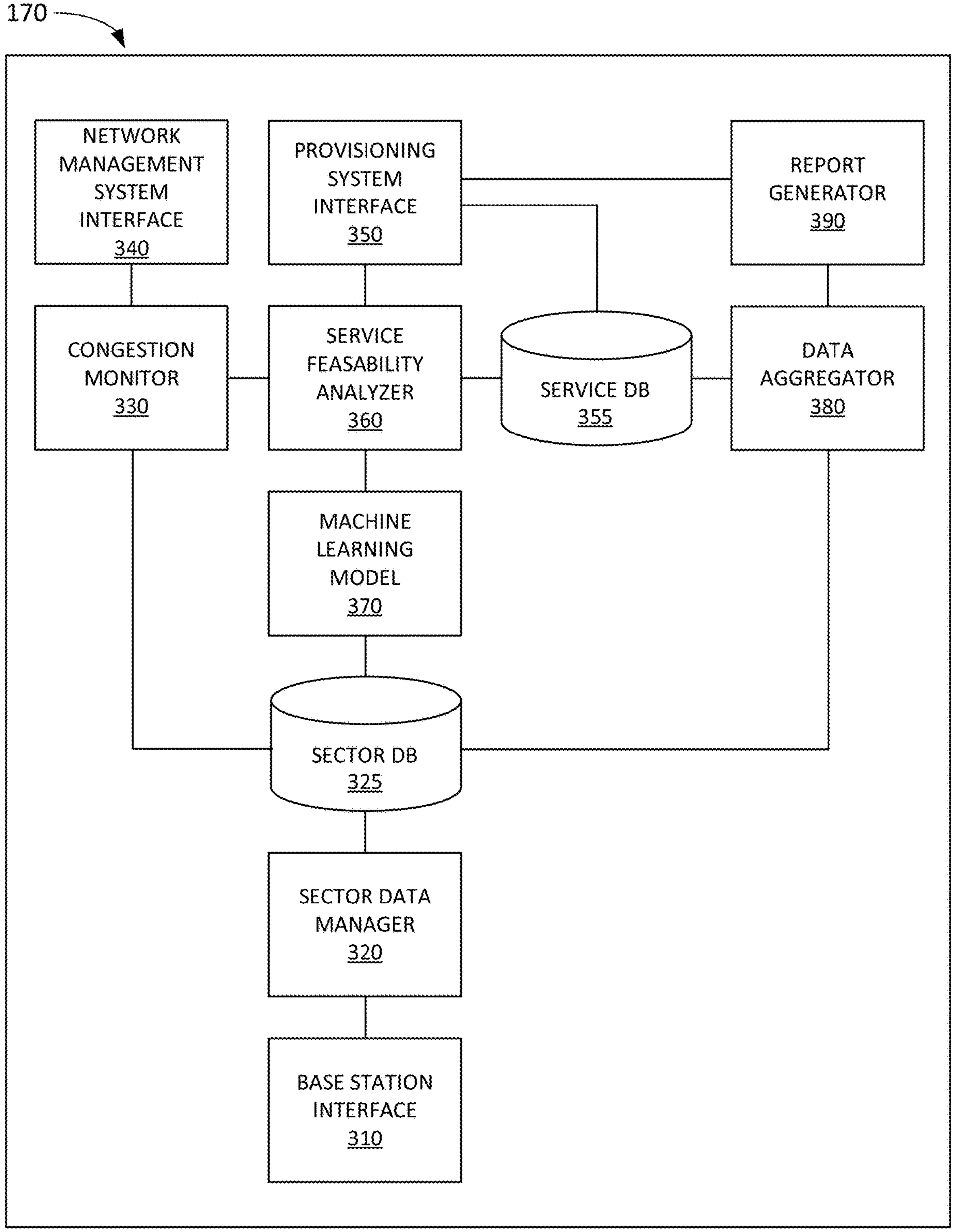
FIG. 3 illustrates exemplary components of a deployment assessment system according to an implementation described herein.

FIG. 3 is a diagram illustrating exemplary components of deployment assessment system 170. The components of deployment assessment system 170 may be implemented, for example, via processor 220 executing instructions from memory 230. Alternatively, some or all of the components of deployment assessment system 170 may be implemented via hard-wired circuitry. As shown in FIG. 3, deployment assessment system 170 may include a base station interface 310, a sector data manager 320, a sector database (DB) 325, a congestion monitor 330, a network management system interface 340, a provisioning system interface 350, a service DB 355, a service feasibility analyzer 360, a machine learning model 370, a data aggregator 380, and a report generator 390.

Base station interface 310 may be configured to communicate with base station 120 and/or a device or function in RAN 130 or core network 150 configured to collect KPI information for base station 120 (e.g., a Network Data Analytics Function (NWDAF), etc.). Base station interface 310 may obtain KPI information for base station 120. Sector data manager 320 may manage sector information for sectors of base stations 120. For example, sector data manager 320 may obtain KPI information for a sector of base station 120 and store the obtained KPI information in sector DB 325. Exemplary information that may be stored in sector DB 325 is described below with reference to FIG. 4.

Congestion monitor 330 may monitor sectors of base stations 120 for congestion. Congestion monitor 330 may determine, based on information stored in sector DB 325, whether a carrier on a sector of base station 120 is in a congestion condition. For example, congestion monitor 330 may determine whether a percentage of available capacity is less than an available capacity congestion threshold, and/or determine whether the throughput is more than a throughput congestion threshold. If one or more congestion thresholds are reached or exceeded, congestion monitor 330 may designate the carrier on the sector as being under a congestion condition. Congestion monitor 330 may further determine the average number of users, on the carrier, predicted for a future time period multiplied by the average throughput per user predicted for the future time period to determine a predicted future used capacity of the carrier on the sector. If the predicted future used capacity reaches or exceeds the available capacity congestion threshold, congestion monitor 330 may designate the carrier on the sector as entering into a congestion condition during the future time period. If a congestion monitor 330 detects a congestion condition for a carrier on a sector, congestion monitor 330 may send an indication to network management system 180 via network management system interface 340.

Network management system interface 340 may be configured to communicate with network management system 180. Network management system interface 340 may receive an indication from congestion monitor 330 that a carrier on a sector of base station 120 is in a congestion condition and send the indication to network management system 180. Network management system 180 may respond to the received indication by performing a capacity budgeting process. For example, network management system 180 may increase a capacity of base station 120, perform load balancing, adjust a maximum number of connections enabled for base station 120, and/or perform another type of capacity budgeting operation.

Provisioning system interface 350 may be configured to communicate with provisioning system 190. Provisioning system interface 350 may receive an indication from service feasibility analyzer 360 that a wireless communication service satisfies a deployment requirement with respect to a sector of base station 120, and send the indication to provisioning system 190. Provisioning system 190 may respond to the received indication by provisioning the wireless communication service on the carrier on the sector of base station 120. Furthermore, provisioning system interface 350 may receive, from provisioning system 190, information relating to requirements associated with a wireless communication service and store the received information in service DB 355.

Service DB 355 may store information relating to wireless communication services that are to be deployed in RAN 130. Exemplary information that may be stored in service DB 355 is described below with reference to FIG. 5. Service feasibility analyzer 360 may analyze the feasibility of deploying a wireless communication service on a carrier on a sector of base station 120. Service feasibility analyzer 360 may use machine learning model 370 to analyze the feasibility of deployment of the wireless communication service.

Service feasibility analyzer 360 may use the output generated by machine learning model 370 to determine whether the wireless communication service satisfies a deployment requirement with respect to the carrier on the sector. For example, service feasibility analyzer 360 may determine whether the predicted average latency is less than a latency requirement for the wireless communication service, determine whether a required capacity for the wireless communication service is less than a minimum available capacity threshold for the carrier on the sector, and/or determine whether another type of deployment requirement is satisfied. If the wireless communication service satisfies the deployment requirement, service feasibility analyzer 360 may send an indication to provisioning system 190 via provisioning system interface 350.

Machine learning model 370 may be trained to predict an expected average latency for a wireless communication service for a carrier on a sector, based on one or more service requirements for the wireless communication service and based on a set of KPIs associated with the carrier on the sector. Machine learning model 370 may include, for example, a deep learning neural network model. A deep learning neural network model may include a multilayer perceptron model, a convolutional neural network (CNN), a recurrent neural network (RNN) model, a transformer neural network, a Gated Recurrent Units (GRU) neural network model, an independently recurrent neural network (IndRNN) model, a Neural Turing Machine (NTM) model, and/or another type of neural network. In other implementations, machine learning model 370 may include a different type of machine learning model, such as, for example a support vector machines (SVM) model, a gradient boosting model, a random forest model, a decision tree model, a naïve Bayes classifier model, a K-nearest neighbors (KNN) classifier model, a maximum entropy classifier model, a kernel density estimation classifier model, a Self-Organizing Map (SOM) model, and/or another type of machine learning model.

Machine learning model 370 may take as inputs a set of requirements for a wireless communication service, an available capacity for a carrier on a sector of base station 120, and/or a set of KPI values for the carrier on the sector of base station 120. The set of requirements may include, for example, a latency requirement (e.g., a maximum average latency, etc.), a throughput requirement (e.g., a minimum average throughput, etc.), a security requirement, a reliability requirement, and/or another type of requirement. The set of KPI values may include, for example, values for KPI parameters described below with reference to KPIs field 438 of FIG. 4. Machine learning model 370 may generate a set of outputs that includes a predicted average latency for the wireless communication service, a predicted throughput for the wireless communication service, a required capacity to deploy the wireless communication service on the carrier on the sector, and/or a remaining capacity for the carrier on the sector if the wireless communication service is deployed.

Machine learning model 370 may be trained using supervised learning (e.g., a labeled data set), unsupervised learning (e.g., an unlabeled data set), reinforcement learning, and/or another type of learning methodology. For example, machine learning model 370 may be trained using a data set that relates deployment requirements, KPI values, and/or available capacity to average latency, required capacity, and/or remaining capacity for carriers on sectors of base stations 120. Furthermore, machine learning model 370 may be updated at particular intervals with updated data sets.

Data aggregator 380 may aggregate deployment feasibility data for a wireless communication service with respect to a carrier on a set of sectors. Data aggregator 380 may select a carrier and a set of sectors configured for the carrier, such as, for example, sectors in a selected geographic area. Data aggregator 380 may then generate a table that relates parameters associated with the sectors in the set of sectors. As an example, data aggregator 380 may relate sector locations to predicted average latency. As another example, data aggregator 380 may relate a KPI parameter to predicted average latency. Report generator 390 may generate a report based on aggregator data generated by data aggregator 380. For example, report generator 390 may generate a map that relates sector locations to a predicted average latency. As another example, report generator 390 may generate a plot that relates a KPI parameter to a predicted average latency.

Although FIG. 3 shows exemplary components of deployment assessment system 170, in other implementations, deployment assessment system 170 may include fewer components, different components, additional components, or differently arranged components than depicted in FIG. 3. Additionally, or alternatively, one or more components of deployment assessment system 170 may perform one or more tasks described as being performed by one or more other components of deployment assessment system 170.

Figure 4:
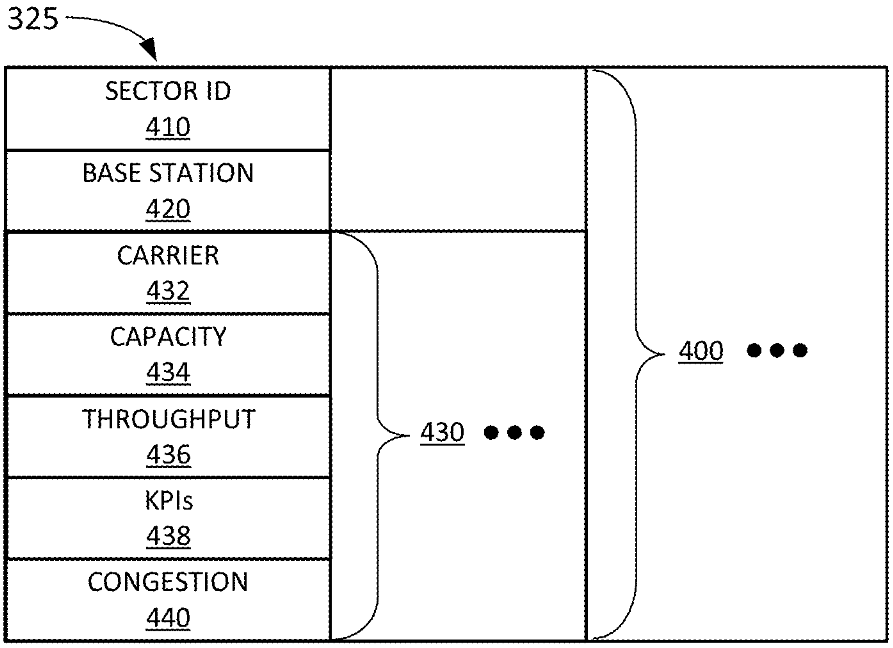
FIG. 4 illustrates exemplary components of a sector database according to an implementation described herein.

FIG. 4 illustrates exemplary components of sector DB 325. As shown in FIG. 4, sector DB 325 may include one or more sector records 400. Each sector record 400 may store information associated with a particular sector of base station 120. Sector record 400 may include a sector identifier (ID) field 410, a base station field 420, and one or more carrier records 430.

Sector ID field 410 may store an ID that uniquely identifies a sector of a particular base station 120 in RAN 130. For example, sector ID field 410 may store an NR Cell Global ID (NCGI), an Evolved Universal Mobile Telecommunications System (UMTS) Terrestrial Radio Access (E-UTRA) Cell Global ID (ECGI), and/or another type of sector ID. Base station field 420 may store an ID for the particular base station 120 associated with the sector.

Each carrier record 430 may store information associated with a carrier for which the particular sector is configured. Carrier record 340 may include a carrier field 432, a capacity field 434, a throughput field 436, a KPIs field 438, and a congestion field 440.

Carrier field 432 may store information identifying a particular carrier associated with the sector. For example, carrier field 432 may identify a particular 5G NR band, 4G LTE band, and/or another type of frequency band used by the sector. Furthermore, carrier field 432 may store information specifying the carrier bandwidth and/or the carrier type, such as, for example, whether the carrier uses time division duplexing (TDD) or frequency division duplexing (FDD).

Capacity field 434 may store total capacity information for the carrier on the sector, such as the total Forward Data Volume (FDV) in megabits per second (mbps) and used capacity information such as an average percentage of FDV in mbps being used over a particular time period. Additional measures of capacity may be included in capacity field 434, such as, for example, the maximum number of UE device 110 connections the carrier on the sector is able to handle, the transmission power associated with the carrier on the sector, how much traffic the carrier on the sector is able to offload to another carrier when experiencing congestion, and/or other measures of capacity. Throughput field 436 may store throughput information for the carrier on the sector such as the FDV of the third busiest hour during a 24 hour period.

KPIs field 438 may store KPI information for the carrier on the sector. The KPI information may be updated at particular intervals. The KPI information may include, for example, the carrier frequency associated with the carrier; an available bandwidth associated with the carrier; a loading or used capacity parameter value for the carrier on the sector, such as, for example, a value for downlink sector average throughput, downlink unused sector capacity, downlink average maximum achievable throughput per user, uplink average throughput, uplink average maximum achievable throughput per user, number of users with a buffer size greater than a buffer threshold, etc.; a spectral efficiency value for the carrier on the sector, such as, for example, a value for a bitrate divided by bandwidth, Physical Downlink Shared Channel (PDSCH) average number of Multiple-Input Multiple-Output (MIMO) layers, PDSCH average single user MIMO percentage, PDSCH average multiuser MIMO percentage, PDSCH average multiuser MIMO number of users, etc.

The KPI information may additionally include a signal strength and/or quality user distribution value for the carrier on the sector, such as, for example, a value for an uplink average pathloss in decibel (dB), a downlink average pathloss, an average Channel Quality Indicator (CQI), an average Reference Signal Received Power (RSRP), an average Reference Signal Received Quality (RSRQ), an average Received Signal Strength Indicator (RSSI), an average Signal to Interference and Noise Ratio (SINR), etc.; a reliability value for the carrier on the sector, such as, for example, a value for a downlink initial Block Error Rate (BLER) percentage, a downlink residual BLER percentage, an average number of retransmission requests, etc.; an application demand parameter value, such as, for example, a value for an average downlink Media Access Layer (MAC) PDUs per millisecond (ms), an average downlink bytes per MAC PDU, an average number of downlink Radio Link Control (RLC) PDUs per MAC PDU, an average number of MAC burst bytes, etc.

The KPI information may additionally include a value for a Physical Downlink Control Channel (PDCCH) blocking rate (e.g., the percentage of users that cannot be scheduled for receiving downlink control information (DCI), etc.); a value for a PDCCH average aggregation level; a value for a Discontinuous Reception (DRX) sleep percentage; a value for a downlink RLC average packet delay; a value for a downlink Physical Resource Block (PRB) symbol utilization percentage; a value for an average unused downlink PRB symbols per millisecond; and/or other types of KPIs associated with the carrier on the sector.

Congestion field 440 may store information identifying whether the carrier on the sector has been designated as experiencing a congestion condition or is predicted to enter a congestion condition during a future time period.

Although FIG. 4 shows exemplary components of sector DB 325, in other implementations, sector DB 325 may include fewer components, different components, additional components, or differently arranged components than depicted in FIG. 4.

Figure 5:
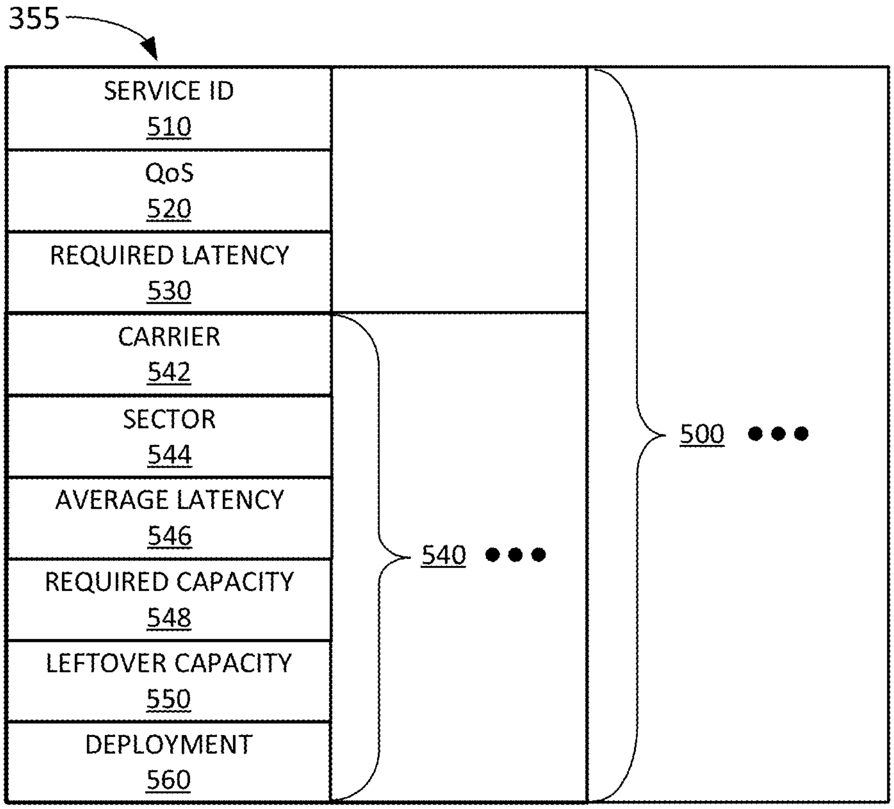
FIG. 5 illustrates exemplary components of a service database according to an implementation described herein.

FIG. 5 illustrates exemplary components of service DB 355. As shown in FIG. 5, service DB 355 may include one or more service records 500. Each service record 500 may store information associated with a particular wireless communication service. Service record 500 may include a service ID field 510, a QoS field 520, a required latency field 530, and one or more carrier records 540.

Service ID field 510 may store an ID associated with a wireless communication service. Furthermore, service ID field 510 may identify a type for the wireless communication service, such as whether the wireless communication service corresponds to a QoS class, network slice, MEC service, and/or another type of service, and may include a description of the wireless communication service.

QoS field 520 may store information identifying a QoS class associated with the wireless communication service. Required latency field 530 may store information identifying a required latency for the wireless communication service. For example, required latency field 530 may identify a maximum allowable average latency for the wireless communication service.

Each carrier record 540 may store information relating to a particular carrier on a particular sector of a particular base station 120. Carrier record 540 may include a carrier field 542, a sector field 544, an average latency field 546, a required capacity field 548, a leftover capacity field 550, and a deployment field 560.

Carrier field 542 may store information identifying a particular carrier associated with the sector. For example, carrier field 542 may identify a particular 5G NR band, 4G LTE band, and/or another type of frequency band used by the sector. Furthermore, carrier field 542 may store information specifying the carrier bandwidth and/or the carrier type, such as, for example, whether the carrier uses TDD or FDD. Sector field 544 may store an ID that uniquely identifies a particular sector of a particular base station 120 in RAN 130. For example, sector field 544 may store an NCGI, an ECGI, and/or another type of sector ID.

Average latency field 546 may store information identifying the predicted average latency for the wireless communication service on the particular carrier on the particular sector. Required capacity field 548 may store information identifying the required capacity for the particular carrier on the particular sector to implement the wireless communication service while satisfying the requirements of the wireless communication service for an expected number of users. The expected number of users may be determined based on the KPI information relating to the number of users on particular carrier on the particular sector. The required capacity may be specified as a bandwidth capacity, a throughput capacity, a number of users capacity, a throughput per user capacity, and/or another measure of capacity.

Leftover capacity field 550 may store information identifying the capacity that will be left over for other wireless communication services for the particular carrier on the particular sector if the wireless communication service is deployed on the particular carrier on the particular sector. The leftover capacity may be specified as a bandwidth capacity, a throughput capacity, a number of users capacity, a throughput per user capacity, and/or another measure of capacity. Deployment field 560 may store information indicating whether service feasibility analyzer 360 determined that the wireless communication service satisfies a deployment requirement with respect to the particular carrier on the particular sector.

Although FIG. 5 shows exemplary components of service DB 355, in other implementations, service DB 355 may include fewer components, different components, additional components, or differently arranged components than depicted in FIG. 5.

Figure 6A:
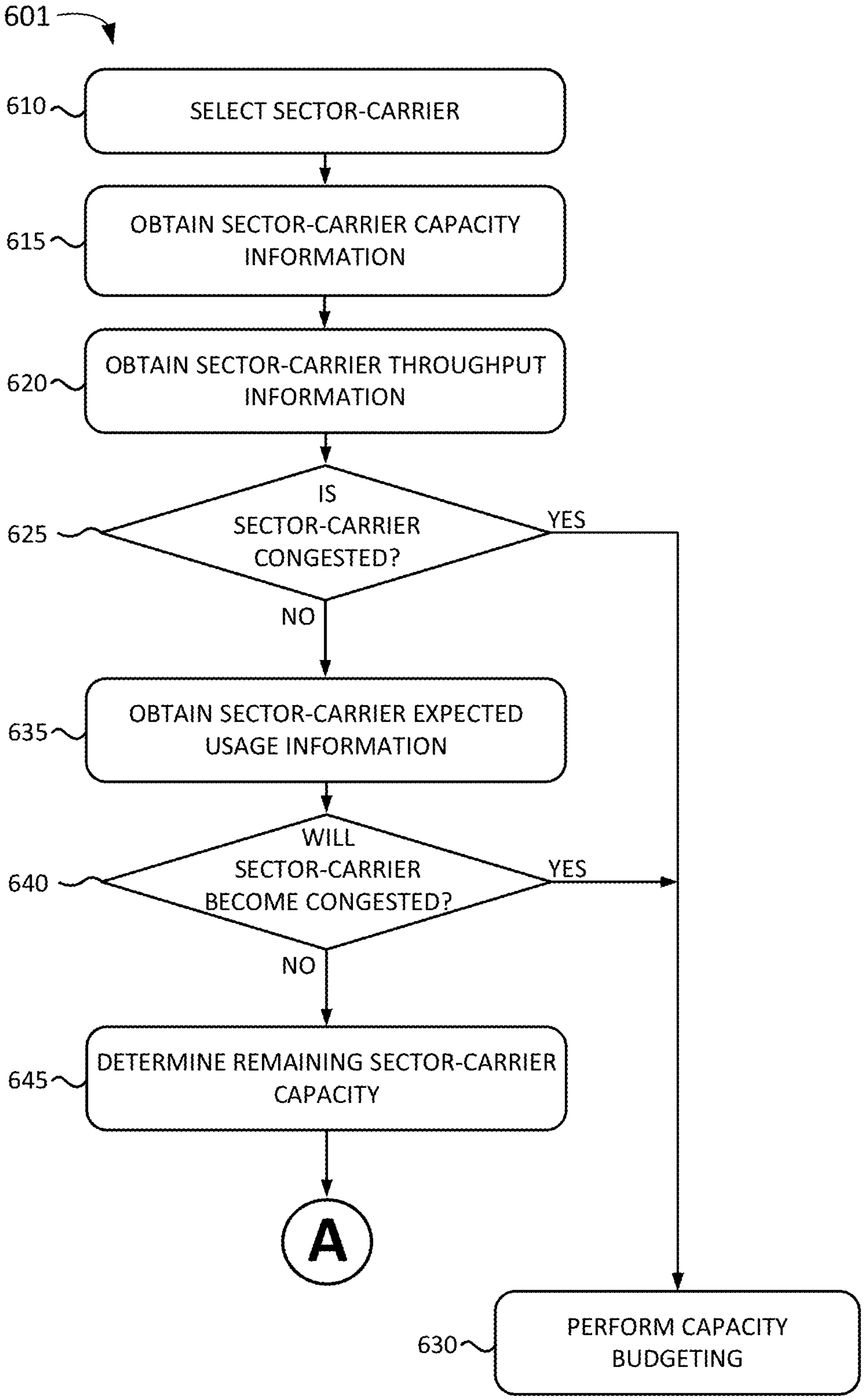
FIGS. 6A and 6B illustrate a flowchart for a process of determining whether a wireless communication service can be implemented on a carrier on a sector of a base station according to an implementation described herein.
Figure 6B:
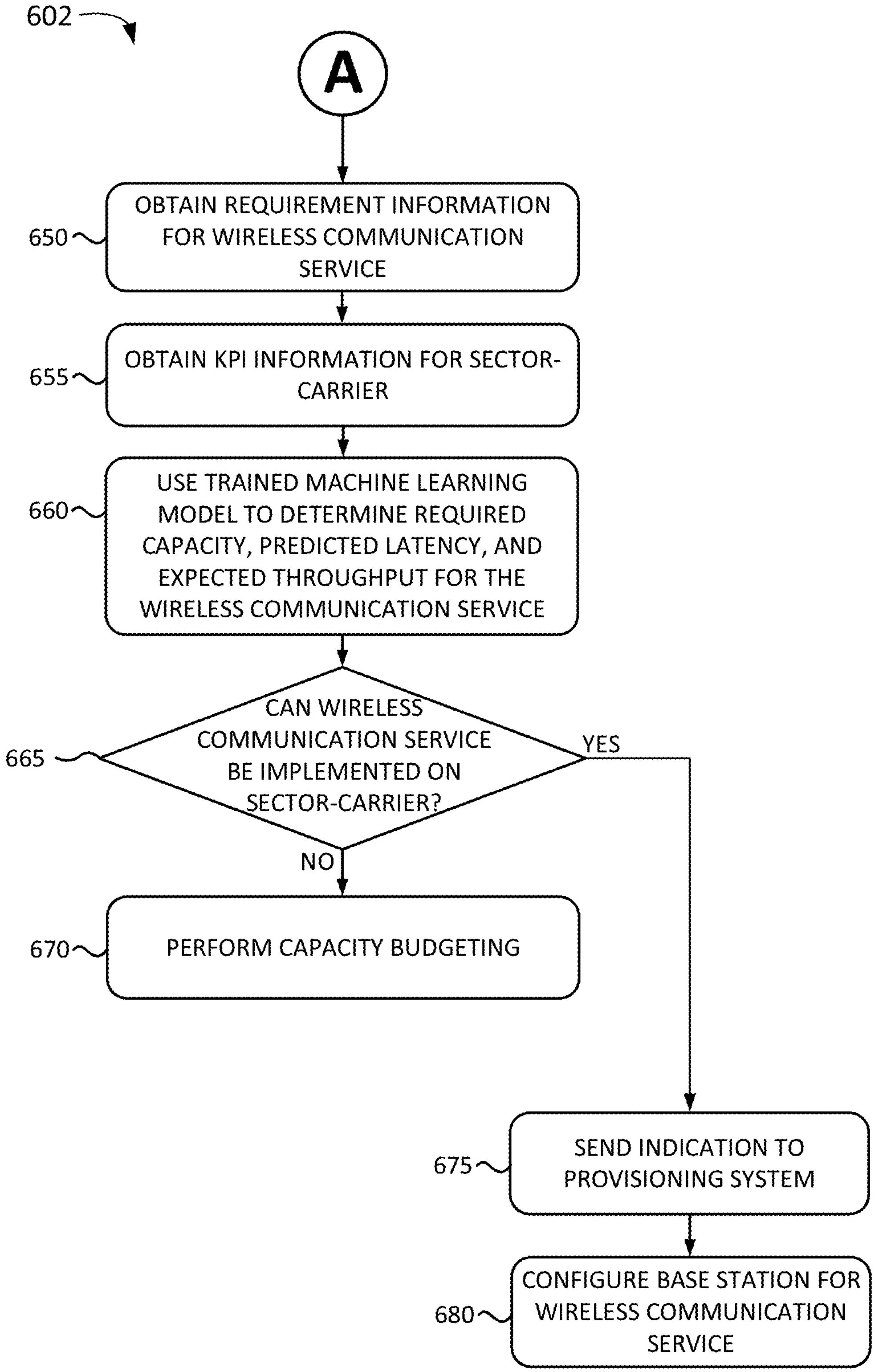

FIGS. 6A and 6B illustrate a flowchart for processes 601 and 602 of determining whether a wireless communication service can be implemented on a carrier on a sector of a base station. In some implementations, processes 601 and 602 may be performed by deployment assessment system 170. In other implementations, some or all of processes 601 and/or 602 may be performed by another device or a group of devices.

As shown in FIG. 6A, process 601 may include selecting a sector-carrier (block 610), obtaining sector-carrier capacity information (block 620), and obtaining sector-carrier throughput information (block 630). For example, deployment assessment system 170 may select a sector of base station 120 and a carrier for which the selected sector is configured. Deployment assessment system 170 may then obtain total capacity information for the carrier on the sector, such as the total FDV and used capacity information such as an average percentage of FDV being used over a particular time period. Additionally, deployment assessment system 170 may obtain throughput information for the carrier on the sector such as the FDV of the third busiest hour during a 24 hour period.

A determination may be made as to whether the sector-carrier is congested (block 625). For example, deployment assessment system 170 may determine whether a percentage of available capacity (e.g., total capacity minus the used capacity, etc.) is less than an available capacity congestion threshold for existing wireless communication services deployed on the carrier on the sector. Additionally, or alternatively, deployment assessment system 170 may determine whether the throughput is more than a throughput congestion threshold. If one or more congestion thresholds are reached or exceeded, deployment assessment system 170 may designate the carrier on the sector as being under a congestion condition.

If it is determined that the sector-carrier is congested (block 625—YES), the processing may continue to perform capacity budgeting (block 630). For example, deployment assessment system 170 may send an instruction to network management system 180 to perform capacity budgeting. In response, network management system 180 may increase a capacity of base station 120, perform load balancing, adjust a maximum number of connections enabled for base station 120, and/or perform another type of capacity budgeting operation.

If it is determined that the sector-carrier is not congested (block 625—NO), processing may continue to obtain sector-carrier expected usage information (block 635). For example, deployment assessment system 170 may obtain information identifying the average number of users of the carrier on the sector and obtain information identifying the average throughput per user.

A determination may be made as to whether the sector-carrier will become congested (block 640). For example, deployment assessment system 170 may determine the average number of users on the carrier predicted for a future time period multiplied by the average throughput per user predicted for the future time period to determine the predicted future used capacity of the carrier on the sector. The predicted average number of users may be based on, for example, an expected future number of users of the new wireless communication service, once deployed. Deployment assessment system 170 may then determine whether a predicted percentage of available capacity (e.g., total capacity minus the predicted future used capacity, etc.) is less than an available capacity congestion threshold. If the available capacity congestion threshold is reached or exceeded, deployment assessment system 170 may designate the carrier on the sector as entering a congestion condition during the future time period.

If it is determined that the sector-carrier will become congested (block 640—YES), the processing may continue to perform capacity budgeting (block 630) as described above. If it is determined that the sector-carrier will not not congested (block 640—NO), the processing may continue to determine remaining sector-carrier capacity (block 645). For example, deployment assessment system 170 may determine the remaining capacity of the carrier on the sector based on the difference between the total capacity and the current and/or predicted future used capacity.

The processing may continue to process 602 of FIG. 6B. Process 602 may include obtaining requirement information for a wireless communication service (block 650) and obtaining KPI information for the sector-carrier (block 655). For example, deployment assessment system 170 may obtain a set of requirements for a new QoS class, network slice, MEC service, and/or another type of wireless communication service from provisioning system 190. The set of requirements may include, for example, a latency requirement (e.g., a maximum average latency, etc.), a throughput requirement (e.g., a minimum average throughput, etc.), a security requirement, a reliability requirement, and/or another type of requirement. Deployment assessment system 170 may further obtain KPI information for the carrier on the sector of base station 120. The KPI information may include, for example, KPI information described above with reference to KPI field 438 of FIG. 4. Deployment assessment system 170 may obtain the KPI information from base station 120 and/or from device/function in core network 150 that is configured to collect KPI information from base station 120, such as, for example, an NWDAF.

Process 602 may further include using a trained machine learning model to determine the required capacity, predicted latency, and expected throughput for the wireless communication service (block 660). For example, deployment assessment system 170 may provide the obtained requirement information for a wireless communication service and the obtained KPI information for the sector-carrier as inputs into machine learning model 370 and obtain, as outputs, a predicted average latency for the wireless communication service, a predicted throughput for the wireless communication service, a required capacity to deploy the wireless communication service on the carrier on the sector, and/or a remaining capacity for the carrier on the sector if the wireless communication service is deployed.

A determination may be made as to whether the wireless communication service can be implemented on the sector-carrier (block 665). Deployment assessment system 170 may determine whether the wireless communication service satisfies a deployment requirement. For example, deployment assessment system 170 may determine whether the predicted average latency is less than a latency requirement for the wireless communication service, determine whether a required capacity for the wireless communication service is less than a minimum available capacity threshold for the carrier on the sector, and/or determine whether another type of deployment requirement is satisfied.

If it is determined that the wireless communication service cannot be implemented on the sector-carrier (block 665—NO), the processing may continue to perform capacity budgeting (block 670), as described above with respect to block 630. If it is determined that the wireless communication service can be implemented on the sector-carrier (block 665—YES), the processing may continue to send an indication to a provisioning system (block 675) and configure a base station for the wireless communication service (block 680). For example, deployment assessment system 170 may send an indication to provisioning system 190 that the carrier on the sector satisfies the deployment requirement. In response, provisioning system 190 may configure base station 120, associated with the sector, to implement the wireless communication service. For example, provisioning system 190 may reserve resources of base station 120, and/or other components of RAN 130, such as a Distributed Unit (DU) and/or a Centralized Unit (CU), service, needed to satisfy the requirements of the wireless communication service. Furthermore, provisioning system 190 may assign a priority to PDUs associated with the wireless communication service based on a QoS class associated with the wireless communication service. Moreover, if required, provisioning system 190 may configure routing/forwarding of PDUs associated with the wireless communication service to a network slice and/or MEC network 140.

Figure 7:
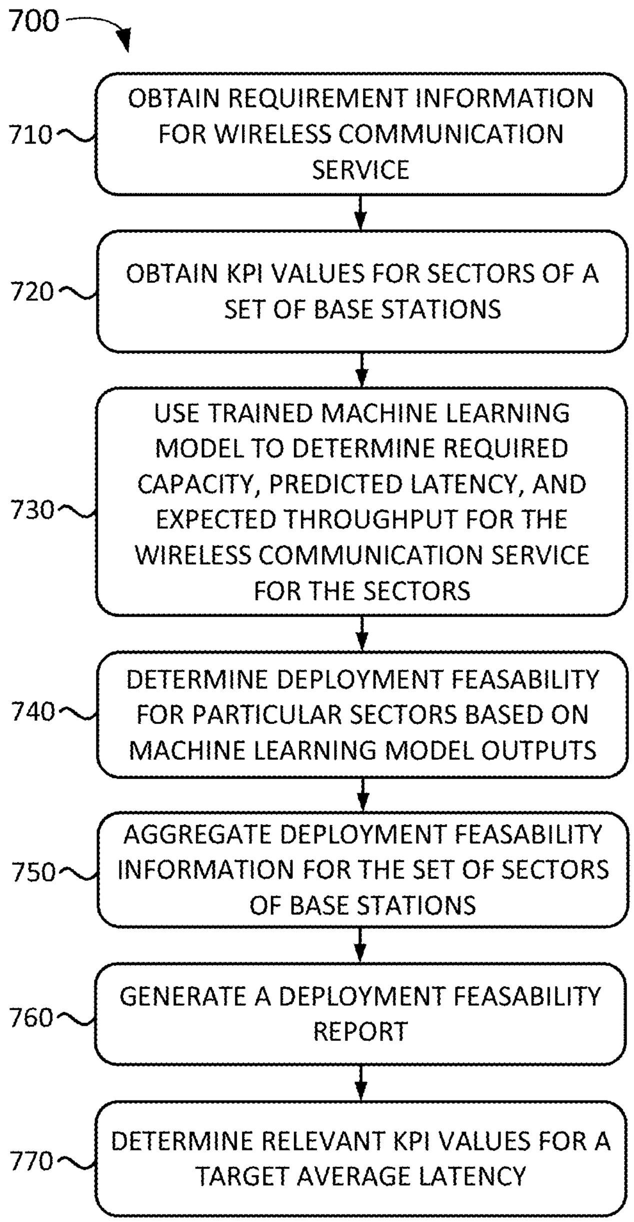
FIG. 7 illustrates a flowchart for a process of determining feasibility of deployment of a wireless communication service according to an implementation described herein.

FIG. 7 illustrates a flowchart for a process 700 of determining feasibility of deployment of a wireless communication service according to an implementation described herein. In some implementations, process 700 may be performed by deployment assessment system 170. In other implementations, some or all of process 700 may be performed by another device or a group of devices.

As shown in FIG. 7, process 700 may include obtaining requirement information for a wireless communication service (block 710), obtaining KPI values for sectors of a set of base stations (block 720), and using a trained machine learning model to determine a required capacity, predicted latency, and expected throughput for the wireless communication service for the sectors (block 730). For example, deployment assessment system 170 may perform the process described above with respect to blocks 650, 655, and 660 for a carrier for a set of different sectors.

Process 700 may further include determining deployment feasibility for particular sectors based on the machine learning model outputs (block 740) and aggregating the deployment feasibility information for the set of sectors of base stations (block 750). For example, deployment assessment system 170 may, for each sector in the set of sectors, determine whether the predicted average latency is less than a latency requirement for the wireless communication service, determine whether a required capacity for the wireless communication service is less than a minimum available capacity threshold for the carrier on the sector, and/or determine whether another type of deployment requirement is satisfied. Deployment assessment system 170 may then generate a table that relates parameters associated with the sectors in the set of sectors.

Process 700 may further include generating a deployment feasibility report (block 760) and determining relevant KPI values for a target average latency (block 770). For example, deployment assessment system 170 may generate a report based on aggregator data generated by data aggregator 380. For example, deployment assessment system 170 may generate a map that relates sector locations to predicted average latency. Furthermore, deployment assessment system 170 may generate a plot that relates a KPI parameter to predicted average latency. Deployment assessment system 170 may additionally perform a machine learning interpretability (MLI) process to identify relevant KPIs for the set of sectors. For example, deployment assessment system 170 may use a Local Interpretable Model-Agnostics Explanations (LIME) model, a Shapley Additive Explanations (SHAP) model, a Building Blocks of Interpretability (BBI) model, and/or another type of MLI model to determine the contribution made by each KPI to the predicted average latency and may rank the KPIs based on the importance of each KPI. The MLI output may include a ranked list of KPIs along with an importance score for each KPI, indicating the importance of the KPI to the predicted average latency.

Figure 8:
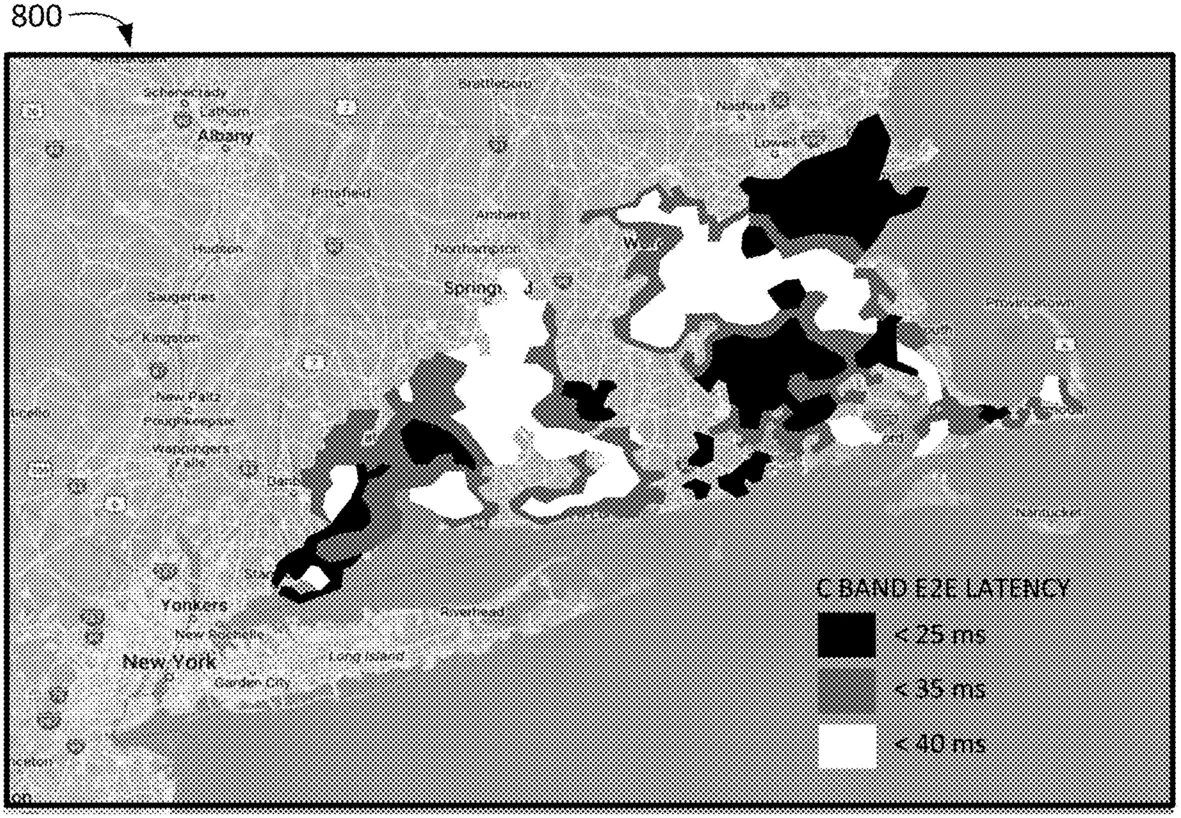
FIG. 8 illustrates an exemplary map of expected latency at different locations for a wireless communication service according to an implementation described herein.

FIG. 8 illustrates an exemplary map 800 of expected latency at different location for a wireless communication service. Map 800 may display predicted average latency for a proposed cloud gaming network slice for a set of base stations in a geographic area. The predicted average latency may range from less than 30 ms to 40 ms. If the required latency is less than 25 ms, map 800 may indicate areas where the cloud gaming network slice may be deployed.

Figure 9:
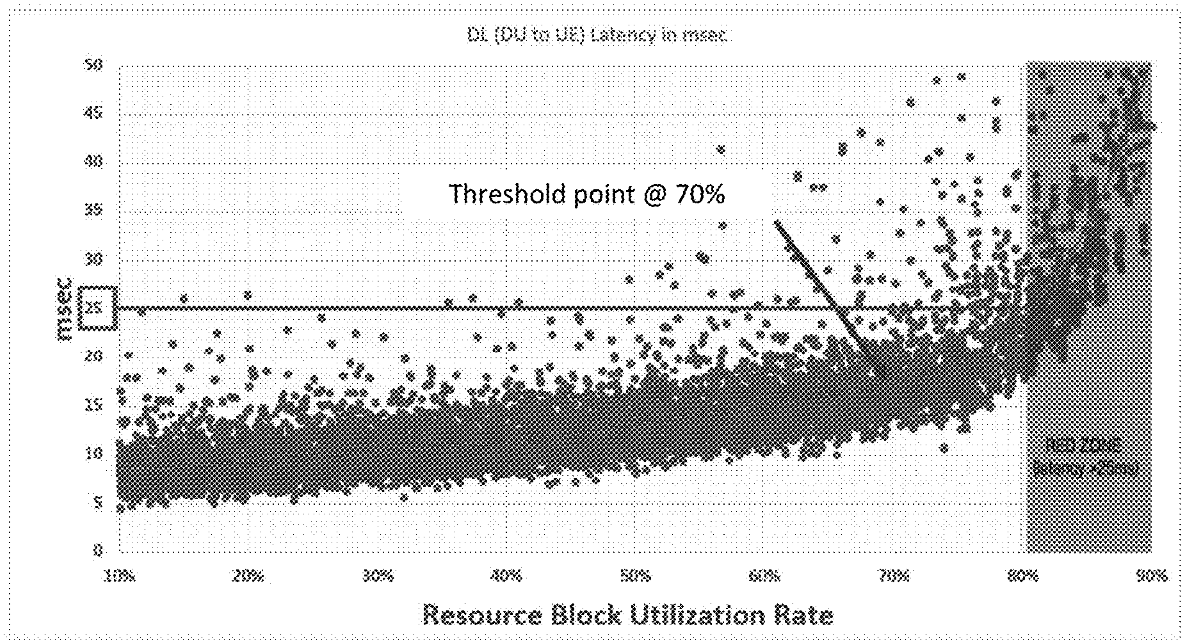
FIG. 9 illustrates an exemplary plot of expected latency versus resource block utilization rate for a wireless communication service according to an implementation described herein.

FIG. 9 illustrates an exemplary plot 900 of expected latency versus resource block utilization rate for the proposed cloud gaming network slice. Plot 900 illustrates that for a predicted required latency of less than 25 ms, an average resource block utilization rate of less than 80% may be required. A threshold point of resource block utilization rate of 70% may be set as a requirement in order to guarantee that the service requirements of the proposed cloud gaming network slice are met.

Figure 10:
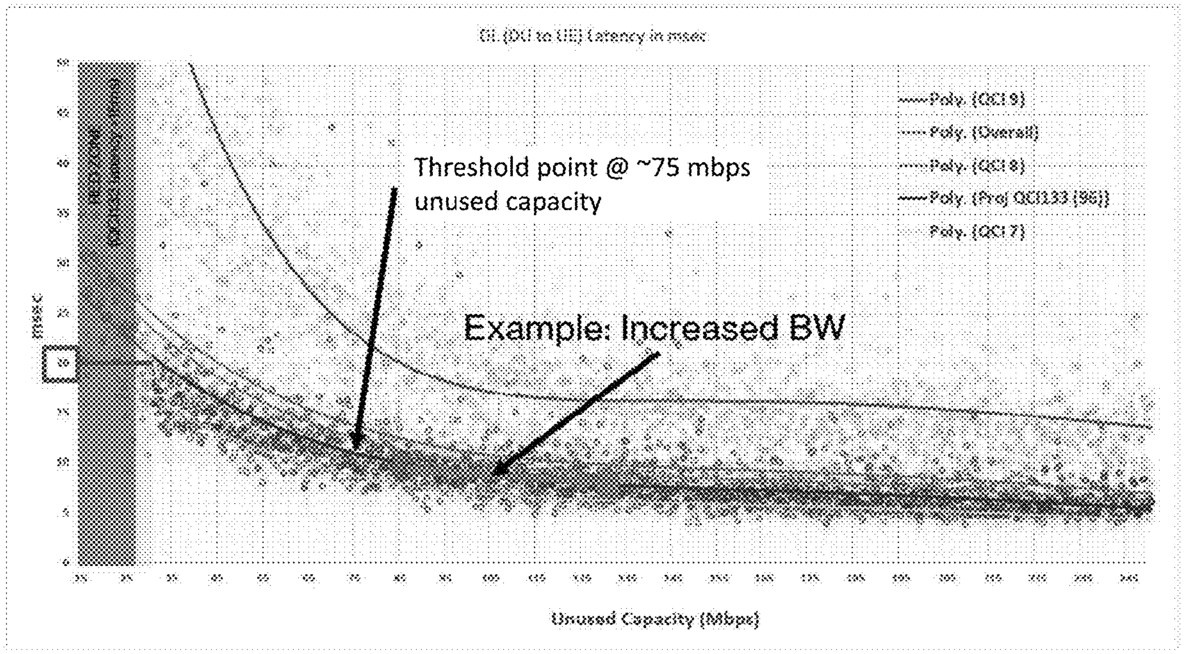
FIG. 10 illustrates an exemplary plot of expected latency versus unused capacity for a wireless communication service according to an implementation described herein.

FIG. 10 illustrates an exemplary plot 1000 of expected latency versus unused capacity for the proposed cloud gaming network slice. Plot 1000 compares the capacity in mbps for different QoS classes, including a proposed QoS class QCI 133 for the proposed cloud gaming network slice. A threshold point at 75 mbps may be selected as a requirement in order to guarantee that the service requirements of the proposed cloud gaming network slice are met.

Figure 11:
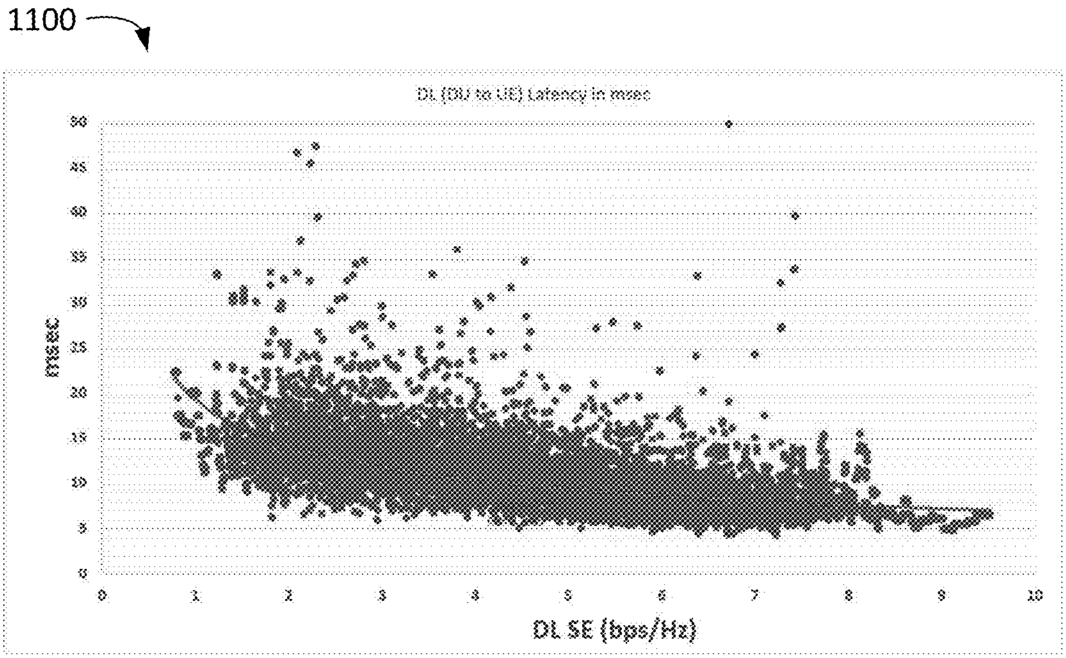
FIG. 11 illustrates an exemplary plot of expected latency versus spectral efficiency for a wireless communication service according to an implementation described herein.
Figure 12:
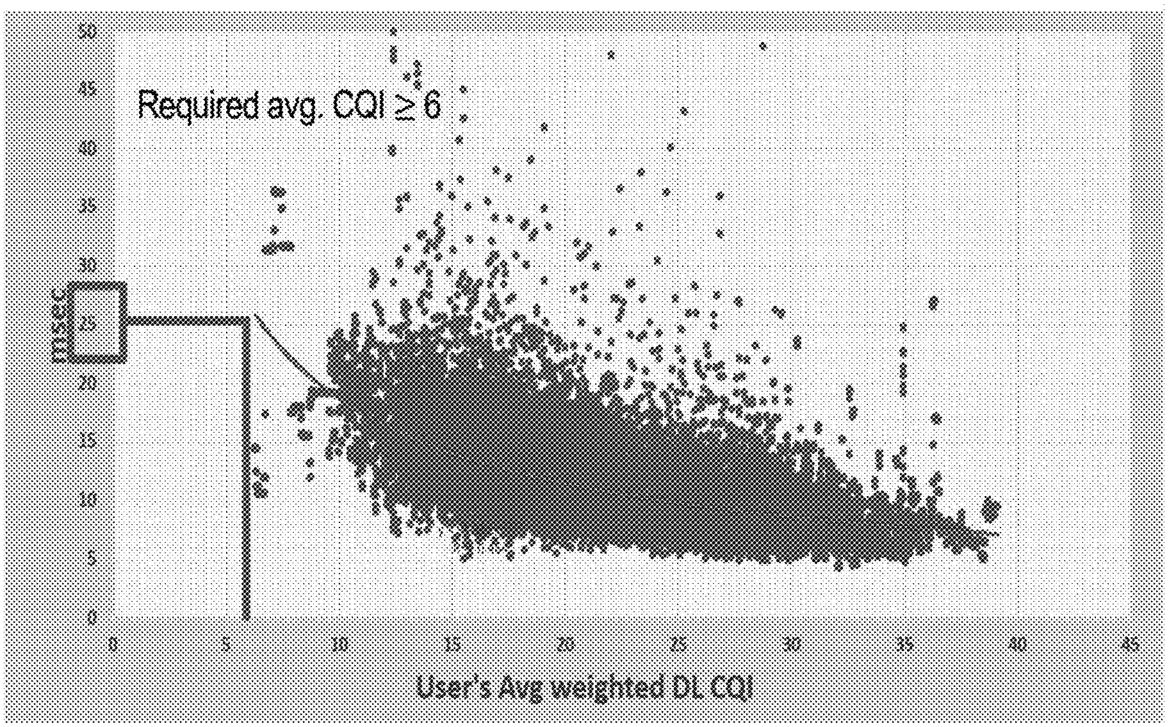
FIG. 12 illustrates an exemplary plot of expected latency versus signal quality for a wireless communication service according to an implementation described herein.
Figure 13:
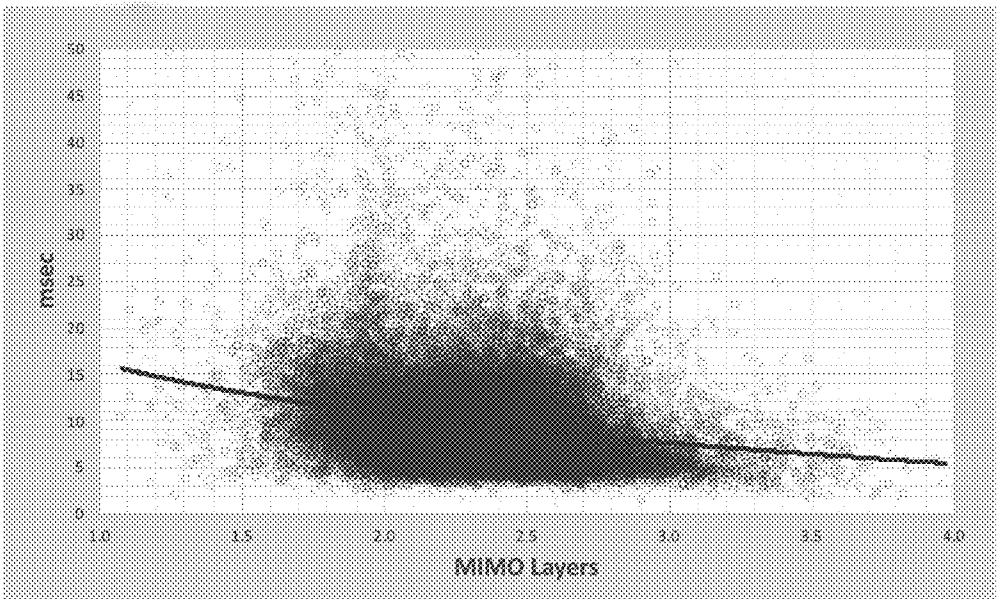
FIG. 13 illustrates an exemplary plot of expected latency versus Multiple-Input Multiple-Output (MIMO) layers for a wireless communication service according to an implementation described herein.

FIG. 11 illustrates an exemplary plot 1100 of expected latency versus spectral efficiency (SE) for the proposed cloud gaming network slice. Plot 1100 illustrates that higher spectral efficiency results in a lower predicted average latency. FIG. 12 illustrates an exemplary plot 1200 of expected latency versus signal quality for the proposed cloud gaming network slice. Plot 1200 illustrates that higher CQI results in a lower predicted average latency. FIG. 13 illustrates an exemplary plot 1300 of expected latency versus MIMO layers for the proposed cloud gaming network slice. Plot 1300 illustrates that a higher number of MIMO layers results in a lower predicted average latency.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6A, 6B, and 7, the order of the blocks may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:

determining, by a computing device, that a carrier on a sector of a base station has a sufficient capacity to deploy a wireless communication service based on a current capacity and an expected future capacity;

obtaining, by the computing device, one or more requirements for the wireless communication service to be deployed on the carrier on the sector of the base station;

obtaining, by the computing device, one or more key performance indicator (KPI) values for the carrier on the sector of the base station;

using, by the computing device, a trained machine learning model to determine a required capacity and a predicted average latency for the wireless communication service based on the obtained one or more requirements and the obtained one or more KPI values;

determining, by the computing device, that the wireless communication service satisfies a deployment requirement to be deployed on the carrier on the sector of the base station based on the determined required capacity and the predicted average latency; and deploying, by the computing device, the wireless communication service on the carrier on the sector of the base station, in response to determining that the wireless communication service satisfies the deployment requirement.

2. The method of claim 1, wherein the one or more KPI values include at least one of:

a carrier frequency, an available bandwidth value, an unused capacity value, a spectral efficiency value, a user distribution value, a reliability value, an application demand value, or a discontinuous mode percentage value.

3. The method of claim 1, further comprising:

using the trained machine learning model to determine a leftover capacity for the carrier on the sector of the base station if the wireless communication service is deployed.

4. The method of claim 1, further comprising:

determining whether the carrier on the sector of the base station has a sufficient capacity to deploy another wireless communication service.

5. The method of claim 4, wherein the sufficient capacity to deploy the other wireless communication service is based on the current capacity and the expected future capacity.

6. The method of claim 5, wherein the current capacity is based on an available capacity associated with the carrier on the sector of the base station and a throughput associated with the carrier on the sector of the base station.

7. The method of claim 5, wherein the expected future capacity is based on an expected average number of users and an expected throughput per user.

8. The method of claim 4, wherein determining whether the carrier on the sector of the base station has the sufficient capacity to deploy the other wireless communication service includes determining that the carrier on the sector of the base station does not have the sufficient capacity to deploy the other wireless communication service, the method further comprising:

designating the carrier on the sector of the base station as a congested carrier on the sector; and performing capacity budgeting for the carrier on the sector of the base station, in response to designating the carrier on the sector of the base station as a congested carrier on the sector.

9. The method of claim 1, further comprising:

determining whether particular ones of a plurality of sectors and carriers of a plurality of base stations satisfy the deployment requirement for the wireless communication service;

aggregating deployment feasibility information for the plurality of sectors and carriers of the plurality of base stations; and generating a deployment feasibility report for the plurality of base stations based on the aggregated deployment feasibility information.

10. The method of claim 1, wherein the wireless communication service includes at least one of:

a Quality of Service (QoS) class, a network slice, or a Multi-Access Edge Computing (MEC) service.

11. A device comprising:

a processor configured to:

determine that a carrier on a sector of a base station has a sufficient capacity to deploy a wireless communication service based on a current capacity and an expected future capacity;

obtain one or more requirements for the wireless communication service to be deployed on the carrier on the sector of the base station;

obtain one or more key performance indicator (KPI) values for the carrier on the sector of the base station;

use a trained machine learning model to determine a required capacity and a predicted average latency for the wireless communication service based on the obtained one or more requirements and the obtained one or more KPI values;

determine that the wireless communication service satisfies a deployment requirement to be deployed on the carrier on the sector of the base station based on the determined required capacity and the predicted average latency; and deploy the wireless communication service on the carrier on the sector of the base station, in response to determining that the wireless communication service satisfies the deployment requirement.

12. The device of claim 11, wherein the one or more KPI values include at least one of:

a carrier frequency, an available bandwidth value, an unused capacity value, a spectral efficiency value, a user distribution value, a reliability value, an application demand value, or a discontinuous mode percentage value.

13. The device of claim 11, wherein the processor is further configured to:

use the trained machine learning model to determine a leftover capacity for the carrier on the sector of the base station if the wireless communication service is deployed.

14. The device of claim 11, wherein the processor is further configured to:

determine whether the carrier on the sector of the base station has a sufficient capacity to deploy another wireless communication service.

15. The device of claim 14, wherein the sufficient capacity to deploy the other wireless communication service is based on the current capacity and the expected future capacity.

16. The device of claim 15, wherein the current capacity is based on an available capacity associated with the carrier on the sector of the base station and a throughput associated with the carrier on the sector of the base station.

17. The device of claim 15, wherein the expected future capacity is based on an expected average number of users and an expected throughput per user.

18. The device of claim 14, wherein, when determining whether the carrier on the sector of the base station has the sufficient capacity to deploy the other wireless communication service, the processor is further configured to determine that the carrier on the sector of the base station does not have the sufficient capacity to deploy the other wireless communication service, and wherein the processor is further configured to:

designate the carrier on the sector of the base station as a congested carrier on the sector; and perform capacity budgeting for the carrier on the sector of the base station, in response to designating the carrier on the sector of the base station as a congested carrier on the sector.

19. The device of claim 11, wherein the processor is further configured to:

determine whether particular ones of a plurality of sectors and carriers of a plurality of base stations satisfy the deployment requirement for the wireless communication service;

aggregate deployment feasibility information for the plurality of sectors and carriers of the plurality of base stations; and generate a deployment feasibility report for the plurality of base stations based on the aggregated deployment feasibility information.

20. A non-transitory computer-readable memory device, storing instructions executable by a processor, the non-transitory computer-readable memory device comprising:

one or more instructions to determine that a carrier on a sector of a base station has a sufficient capacity to deploy a wireless communication service based on a current capacity and an expected future capacity;

one or more instructions to obtain one or more requirements for the wireless communication service to be deployed on the carrier on the sector of the base station;

one or more instructions to obtain one or more key performance indicator (KPI) values for the carrier on the sector of the base station;

one or more instructions to use a trained machine learning model to determine a required capacity and a predicted average latency for the wireless communication service based on the obtained one or more requirements and the obtained one or more KPI values;

one or more instructions to determine that the wireless communication service satisfies a deployment requirement to be deployed on the carrier on the sector of the base station based on the determined required capacity and the predicted average latency; and one or more instructions to deploy the wireless communication service on the carrier on the sector of the base station, in response to determining that the wireless communication service satisfies the deployment requirement.

* * * * *